(12) United States Patent
Lankes et al.

(10) Patent No.: US 10,804,948 B2
(45) Date of Patent: Oct. 13, 2020

(54) COMPENSATOR

(71) Applicant: Continental Advanced Antenna GMBH, Hildesheim (DE)

(72) Inventors: Thomas Lankes, Rosenheim (DE); Gerhard Stadler, Raubling (DE); Rudolf Weber, Tuntenhausen (DE); Thomas Schubeck, Raubling/Nicklheim (DE)

(73) Assignee: CONTINENTAL ADVANCED ANTENNA GMBH, Hildesheim (DE)

( * ) Notice: Subject to any disclaimer, the term of this patent is extended or adjusted under 35 U.S.C. 154(b) by 302 days.

(21) Appl. No.: 15/565,391

(22) PCT Filed: Apr. 8, 2016

(86) PCT No.: PCT/EP2016/000590
§ 371 (c)(1),
(2) Date: Oct. 9, 2017

(87) PCT Pub. No.: WO2016/162125
PCT Pub. Date: Oct. 13, 2016

(65) Prior Publication Data
US 2018/0159578 A1   Jun. 7, 2018

(30) Foreign Application Priority Data
Apr. 9, 2015 (DE) .................. 10 2015 004 721

(51) Int. Cl.
*H01Q 1/32* (2006.01)
*H04B 1/3877* (2015.01)
(Continued)

(52) U.S. Cl.
CPC ............. *H04B 1/3877* (2013.01); *H01Q 1/32* (2013.01); *H01Q 21/28* (2013.01); *H04B 7/04* (2013.01); *H01Q 1/325* (2013.01); *H04B 17/12* (2015.01)

(58) Field of Classification Search
CPC ........... H01Q 21/28; H01Q 1/325; H01Q 1/32
See application file for complete search history.

(56) References Cited

U.S. PATENT DOCUMENTS 6,175,748 B1    1/2001 Aboukhalil et al.
6,201,501 B1 *  3/2001 Arkko ................. H01Q 1/243
                                                    343/700 MS
(Continued)

FOREIGN PATENT DOCUMENTS

CN        101166068 A      4/2008
DE      102007039879 A1    3/2009
(Continued)

OTHER PUBLICATIONS

ISA European Patent Office, International Search Report Issued in Application No. PCT/EP2016/000590, dated Jun. 30, 2016, WIPO, 6 pages.
(Continued)

*Primary Examiner* — Graham P Smith
(74) *Attorney, Agent, or Firm* — McCoy Russell LLP

(57) ABSTRACT

The present invention relates to a compensator for the compensation of line losses and/or coupling losses on the connection of a cellular radio end device to an external antenna structure, in particular to an external vehicle antenna structure, wherein the compensator has a first signal path for connecting the cellular radio end device to a first external antenna of the external antenna structure, with the compen-
(Continued)

sator having a second signal path for connecting the cellular radio end device to a second external antenna of the external antenna structure.

22 Claims, 5 Drawing Sheets

(51) Int. Cl.
  *H01Q 21/28* (2006.01)
  *H04B 7/04* (2017.01)
  *H04B 17/12* (2015.01)

(56) References Cited

U.S. PATENT DOCUMENTS

| | | |
|---|---|---|
| 7,133,652 B2 | 11/2006 | Nast et al. |
| 8,406,820 B2 | 3/2013 | Nast |
| 8,718,052 B2 | 5/2014 | Nast et al. |
| 2003/0092379 A1 | 5/2003 | Brothers, Jr. et al. |
| 2003/0100351 A1* | 5/2003 | Friesen ................ H04B 1/3877 455/571 |
| 2005/0070272 A1 | 3/2005 | Marangos |
| 2015/0065067 A1 | 3/2015 | Sugimoto et al. |

FOREIGN PATENT DOCUMENTS

| | | |
|---|---|---|
| DE | 102009027358 A1 | 1/2011 |
| DE | 102010026698 A1 | 1/2012 |
| EP | 0556010 A1 | 8/1993 |
| EP | 1371144 B1 | 5/2005 |
| EP | 1841083 A2 | 10/2007 |
| EP | 2304877 B1 | 11/2011 |
| JP | H09148972 A | 6/1997 |
| JP | H11122137 A | 4/1999 |
| WO | 2012004309 A2 | 1/2012 |

OTHER PUBLICATIONS

China National Intellectual Property Administration of the People's Republic of China, Office Action and Search Report Issued in Application No. 201680020836.5, dated Aug. 5, 2019, 22 pages.

* cited by examiner

COMPENSATOR

CROSS-REFERENCE TO RELATED APPLICATION

The present application is a U.S. National Phase of International Patent Application Serial No. PCT/EP2016/000590, entitled "COMPENSATOR FOR COMPENSATING TRANSMISSION AND/OR COUPLING LOSSES," filed on Apr. 8, 2016. International Patent Application Serial No. PCT/EP2016/000590 claims priority to German Patent Application No. 10 2015 004 721.3, filed on Apr. 9, 2015. The entire contents of each of the abovementioned applications are hereby incorporated by reference in their entirety for all purposes.

TECHNICAL FIELD

The present invention relates to a compensator for compensating line losses and/or coupling losses on the connection of a cellular radio end device to an external antenna structure. The compensator in accordance with the invention can in this respect in particular be used on the connection of a cellular radio end device to an external vehicle antenna structure.

BACKGROUND AND SUMMARY

Compensators known from the prior art in this respect only support one signal path from and to the cellular radio end device and therefore only have one connection for the radio frequency cellular radio signals to an external antenna and one connection to a coupling structure for coupling to the cellular radio end device. Such compensators are known for example, from DE 10 2009 027 358 A1, EP 1 841 083 A2, EP 2 304 877 B1, EP 1 371 144 B1, U.S. Pat. No. 6,175,748 B1 and US 20030100351 A1.

It is the object of the present invention to provide an improved compensator that also supports expanded functionalities of modern cellular radio end devices and/or modern communications standards.

This object is achieved in a first aspect of the invention by a compensator for compensation of line losses and/or coupling losses in the connection of a cellular radio end device to an external antenna structure, in particular to an external vehicle antenna structure, wherein the compensator has a first signal path for connecting the cellular radio end device to a first external antenna of the external antenna structure, and wherein the compensator has a second signal path for connecting the cellular radio end device to a second external antenna of the external antenna structure; and in a second aspect of the invention by a compensator for compensation of line losses and/or coupling losses in a connection of a cellular radio end device to an external antenna structure, in particular to an external vehicle antenna structure, wherein the compensator has a first signal path for connecting the cellular radio end device to a first external antenna of the external antenna structure, and wherein the compensator has a communication interface via which a communication channel is established with the cellular radio end device. Embodiments of the present invention form the subject of the dependent claims.

In a first aspect, the present invention comprises a compensator for compensating line losses and/or coupling losses on the connection of a cellular radio end device to an external antenna structure, wherein the compensator has a first signal path for connecting the cellular radio end device to a first external antenna of the external antenna structure. Provision is made in this respect in accordance with the invention that the compensator still has a second signal path for connecting the cellular radio end device to a second external antenna of the external antenna structure.

The inventors of the present invention have recognized in this respect that the compensators known from the prior art do not support the MIMO functionality used in mobile cellular radio standards such as LTE and therefore result in performance losses, for example with regard to the data rate and the availability. The MIMO functionality of such processes is, in contrast, supported by the second signal path provided in accordance with the invention that allows a connection to a second external antenna.

The compensator in accordance with the invention preferably has two connections for connecting to a coupling structure for coupling to the cellular radio end device and two connections for connecting to the first and second antennas. In this respect, the two external antennas can be separately connected to the compensator. Two connections of the coupling structure for coupling to the cellular radio end device are furthermore also separately connectable to the compensator. The coupling structure can in this respect serve a wireless coupling to the cellular radio end device, but can alternatively also be connected to the cellular radio end device in a wired manner so that the coupling structure in this case essentially represents signal lines.

Provision is preferably made in this respect that the signal paths each connect together one of the connections for connecting to the coupling structure and one of the connectors for connection to an external antenna. The signal transmission in particular takes place separately over the two signal paths. The two signal paths of the compensator in accordance with the invention can furthermore be two parallel signal paths.

The two signal paths of the compensator in accordance with the invention can have different designs in a preferred embodiment of the present invention. The control that carries out the setting of the amplification for the two signal paths can in particular be of a different design in the two signal paths in this process.

In accordance with the invention, the circuit effort that would otherwise have to be operated using two identical signal paths is reduced by the different designs of the two signal paths and a good MIMO functionality is nevertheless provided.

In a preferred embodiment of the present invention, an amplification takes place both in the uplink and in the downlink in the first signal path, while an amplification only takes place in the downlink or only in the uplink, and preferably only in the downlink, in the second signal path. A substantially simpler technical circuit design can hereby be selected for the second signal path and a MIMO functionality can nevertheless be achieved at least in one direction. The fact is hereby taken into account that currently MIMO functionality is anyway only supported in the downlink with LTE.

The connection of the two connections of the compensator in accordance with the invention to the cellular radio end device and in particular to the coupling structure preferably takes place in this respect such that both uplink signals and downlink signals are transmitted over the first signal path while only or predominantly downlink signals are transmitted over the second signal path.

In accordance with a further preferred embodiment of the present invention, the signal processing takes place on one of the two signal paths in dependence on the signal processing in the other signal path and/or in dependence on the measurement values determined in the other signal path. The technical circuit effort can also hereby be reduced since data that are anyway determined for the signal processing in a first signal path can also be used for signal processing in the other signal path.

In this respect, the signal processing in the second signal path preferably takes place in dependence on the signal processing in the first signal path and/or in dependence on the measurement values determined in the first signal path.

In a preferred embodiment, the frequency selection can be set in this respect in one of the signal paths in dependence on the frequency selection in the other signal path. In this respect, the currently used cellular radio operating mode and/or the currently used cellular radio frequency band can in particular be determined in one of the signal paths by evaluating the signals and the frequency section in both signal paths can be set using the results. The frequency selection in the second signal path can in particular be set in dependence on a currently used cellular radio operating mode determined in the first signal path and/or in dependence on a currently used cellular radio frequency band determined in the first signal path.

Alternatively or additionally, the required magnitude of the amplification can be determined and set for both signal paths using measurement values in one signal path. The magnitude of the amplification in the second signal path can in this respect in particular be set in dependence on the magnitude of the amplification in the first signal path.

Provision can furthermore be made that the signal processing takes place using an evaluation of the uplink signals in at least one of the signal paths and preferably in the first signal path. In this respect, the signal processing can in particular take place in the second signal path in dependence on measurement values with respect to the uplink signals in the first signal path.

The currently used cellular radio operating mode and/or the currently used cellular radio frequency band can furthermore be determined using the uplink signals. These determined data are preferably used to control the signal processing and in particular for frequency selection and/or signal separation.

The amplification in the second signal path can furthermore be set in dependence on a currently used cellular radio operating mode. Provision can in particular be made in this respect that the second signal path is switched on or off in dependence on the currently used cellular radio operating mode. The second signal path is in this respect preferably only activated when the currently used cellular radio operating mode also actually supports MIMO operation. If the operating mode does not support MIMO operation, the second signal path is in contrast switched off in order thus to avoid interference on the first signal path.

The currently used cellular radio operating mode can in this respect be determined as described above using the signals in one of the signal paths, and in particular using the uplink signal and/or in the first signal path. Alternatively, the information on the current cellular radio operating mode can, however, also be obtained directly from the cellular radio end device over a communication channel, as will be shown in more detail in the following.

In accordance with a second aspect, the present invention comprises a compensator for compensating line losses and/or coupling losses on the connection of a cellular radio end device to an external antenna structure, wherein the compensator has a first signal path for connecting the cellular radio end device to a first external antenna of the external antenna structure. Provision is made in accordance with the invention in this respect that the compensator has a communication interface via which a communication channel with a cellular radio end device can be established. The present invention in this respect utilizes the fact that modern cellular radio end devices typically anyway have certain communication interfaces via which data on the operation of the cellular radio end device can be read out. They are preferably used in the compensator to improve the system performance.

The signal processing can preferably be set in the first signal path in dependence on data that the compensator obtains from the cellular radio end device over the communication channel. In addition to an improvement of the system performance, the signal evaluation in the compensator can optionally also have a less complex design since the measurement values can be supplemented by or replaced with data that are directly supplied by the cellular radio end device.

The data the compensator receives from the cellular radio end device can in this respect in particular be data on the currently used cellular radio operating mode and/or on the currently used cellular radio frequency band and/or on the current transmission level and/or on the current reception level of the cellular radio end device.

The data received from the cellular radio end device can furthermore be used for setting the signal path separation and/or for a frequency selection and/or for an amplification in the compensator. In this respect, the corresponding signal path separation for separating the uplink signal and the downlink signal can in particular be set via the data on the currently used cellular radio operating mode, and in particular the corresponding frequency selection and/or time selection.

The amplification in the signal path can furthermore be set using the current reception level and/or transmission level of the cellular radio end device, and in particular in the uplink, by comparing the current transmission level of the cellular radio end device with a measured uplink signal level in the compensator and/or in the downlink by comparing the current reception level of the cellular radio end device with a downlink signal level measured in the compensator.

In a preferred embodiment of the present invention, the communication channel over which the compensator communicates with the cellular radio end device is a wireless communication channel. It can, for example, be near field communication (NFC), Bluetooth and/or wireless LAN. Such a wireless communication channel is in this respect in particular used when the compensator is used for connecting a cellular phone to an external antenna. If the compensator is in contrast used for connecting a fixedly installed cellular radio end device to an external antenna, the communication channel can naturally also be wired.

In a possible embodiment of the present invention, the compensator can have a transmission and/or reception unit and/or an antenna for the wireless communication channel Such an embodiment can in particular be used when the compensator is arranged relatively closely to a mount and/or to a support for the cellular radio end device.

Alternatively, the compensator can also be connected via a signal line to a transmission and/or reception unit and/or to an antenna for a wireless communication channel. The transmission and/or reception unit and/or an antenna is in this respect in particular arranged in the region of a mount and/or support for the cellular radio end device and is connected to the compensator over a signal line. The compensator can hereby also be arranged further away from the mount and/or support for the cellular radio end device. In this respect, a transmission and/or reception unit anyway arranged in the region of such a mount and/or support and/or an antenna can optionally be used or co-used for the wireless communication channel.

Provision can be made in this respect that a connection of the compensator for connecting the first signal path of the compensator to the cellular radio end device is also used for the communication with the cellular radio end device and in particular for the communication with the transmission and/or reception unit and/or the antenna for the wireless communication channel A frequency-wise separation in particular takes place in this respect.

The just described second aspect of the present invention can in this respect be used independently of the first aspect of the present invention described further above. In the same manner, the first aspect can also be used independently of the second aspect.

The first aspect can in this respect in particular also be used when no communication interface is provided for establishing a communication channel between the compensator and the cellular radio end device. The second aspect can furthermore also be used when the compensator only has one signal path and can therefore only establish the communication with a single external antenna.

The present invention, however, also comprises a combination of the first and second aspects. The compensator in accordance with the second aspect such as was shown in more detail above can in this respect in particular have a second signal path for connecting the cellular radio end device to a second external antenna of the external antenna structure. With such a combination of the first and second aspects, provision is preferably made that the signal processing is set in both signal paths in dependence on data the compensator receives over the communication channel from the cellular radio end device. The setting of the two communication channels preferably takes place differently in this respect.

Preferred embodiments of a compensator in accordance with the invention both in accordance with the first aspect and in accordance with the second aspect will be shown in more detail in the following:

The present invention can first be used with any desired external antenna structures.

If the external antenna structure has a first and a second external antenna, the first external antenna of the external antenna structure can in particular be a primary external antenna; the second external antenna can be a secondary antenna.

The first and second external antennas can furthermore be arranged both within an assembly or in a roof antenna or can also be arranged spatially separate in two assemblies or one of the antennas can be arranged in a roof antenna and the other in an outside mirror. The external antenna structure can therefore also be a distributed antenna structure.

The compensator in accordance with the invention is in this respect preferably used in the automotive sector, and indeed in particular for connecting a cellular radio end device to an external vehicle antenna structure. The vehicle antenna structure can in this respect in particular be a roof antenna and/or an antenna arranged in an outside mirror.

The present invention can be used with any desired cellular radio end devices. The cellular radio end device can in this respect, for example, be a cellular radio end device whose antenna structure is wirelessly connected via a coupling structure, with the coupling structure then being connected via the compensator in accordance with the invention to the external antenna structure of the vehicle. The cellular radio end devices can in this respect in particular be portable cellular radio end devices and in particular cellular phones such as smartphones.

The cellular radio end device can, however, also be a unit fixedly installed in the automobile that, for example, provides a data connection via the cellular radio network. In this case, the connection between the cellular radio end device and the compensator can be wired.

The compensator in accordance with the invention in this respect serves the amplification of the cellular radio RF frequency signals and preferably amplifies both transmission signals of the cellular radio end device that are forwarded to the external antenna structure (uplink) and reception signals that are forwarded by the external antenna structure to the cellular radio end device (down link).

The compensator in accordance with the invention can have at least one separation arrangement for separating the uplink signal and the downlink signal in the first signal path. In this respect, the signal separation can in particular take place by frequency or by time depending on the active cellular radio operating mode. The active cellular radio operating mode can in this respect be recognized either by analysis of the signal in the signal path, and in particular of the uplink signal, and/or the data provided by the cellular radio end device can be used for controlling the separation arrangement.

No separation arrangement for separating the uplink signal and the second downlink signal is preferably provided in the second signal path. The second signal path can hereby be configured substantially more simply, with an amplification preferably only taking place in the downlink direction in the second signal path.

The compensator in accordance with the invention can furthermore have a frequency selection in the first signal path and/or in the second signal path. The frequency selection in this respect preferably takes place using the currently used cellular radio operating mode and/or the currently used cellular radio frequency band. These data can in turn also be determined using an analysis of the signal, in particular of the uplink signal, and/or can be obtained from the cellular radio end device. The frequency selection is in this respect preferably a controllable frequency filter. In a possible embodiment of the present invention, the frequency selection in the second signal path can be controlled in dependence on the first signal path, and in particular using a current cellular radio operating mode and/or a current cellular radio frequency band determined in the first signal path.

The compensator can furthermore have a measurement arrangement for measuring the signal level of the uplink signal and/or of the downlink signal in the first signal path. In this respect, a separation arrangement is preferably provided that divides the first signal path into an uplink signal path and a downlink signal path, with a measurement arrangement for measuring the signal level being provided in each of these part signal paths. A measurement arrangement for measuring the signal level of the uplink signal and/or of the downlink signal can furthermore be arranged in the second signal path, with only one measurement arrangement for measuring the downlink signal preferably being provided in the second signal path. In this respect, no separation in particular has to be made between the uplink signal and the downlink signal in the second signal path.

The measurement arrangements can in this respect each be built up of a signal decoupler and a power measurement.

The compensator in accordance with the invention in the first signal path can furthermore have at least one respective amplifier for the uplink signal and for the downlink signal, with the amplifiers preferably being arranged in the respective part signal paths of the first signal path. At least one amplifier for the downlink signal is preferably provided for the downlink signal in the second signal path. In this respect, a power amplifier is preferably provided as the amplifier for the uplink signal and a respective low noise amplifier (LNA) for the downlink signals.

The compensator in accordance with the invention can in this respect be designed such that the setting of the amplification in the compensator takes place in accordance with at least one of the following variants:

In accordance with a first variant, the setting of the amplification in the downlink path can take place in dependence on the amplification and/or on the measured values of the uplink path, in particular in dependence on the signal level of the uplink path. In this respect, the setting of the amplification in the respective downlink paths of the first and second signal paths can in particular take place in dependence on the amplification and/or on the measured values of the uplink path of the first signal path. In this respect, the same values and/or similar values can in particular be used for the amplifications in the uplink and in the downlink. In this respect, the coupling damping can be determined by a comparison of the signal level of the uplink signal with a predefined value and the amplifications can be set such that the coupling damping is compensated.

In accordance with a second variant, the setting of the amplification in the downlink path can take place in dependence on measured values with respect to the downlink path, and in particular in dependence on the signal level of the downlink path. In this respect, the setting of the amplification in the respective downlink paths of the first and second signal paths can preferably respectively take place separately in dependence on measurement values relative to the respective downlink path.

In accordance with a third variant, the setting of the amplification in the downlink path can take place in dependence on measured values with respect to the downlink path and to an uplink path. In this respect, the coupling damping can in particular be determined by a comparison of the signal level of the uplink signal with a predefined value and can be used together with the signal level of the downlink signal to set the amplification.

In accordance with a fourth variant, the setting of the amplification in the downlink path can take place in dependence on the data received from the cellular radio end device with respect to a reception level measured by the cellular radio end device, and in particular by a comparison with a signal level of a downlink path of the compensator. In this respect, the setting of the amplification in the respective downlink paths of the first and second signal paths can in particular respectively take place separately in dependence on data with respect to the reception levels measured by the cellular radio end device for a primary and a secondary antenna connection of the cellular radio end device and preferably in dependence on measurement values with respect to the respective downlink path.

In accordance with a fifth variant, the setting of the amplification in the uplink path can take place in dependence on data received from the cellular radio end device with respect to a transmission power output by the cellular radio end device, and preferably in comparison with measurement values with respect to the uplink path and in particular in comparison with a signal level of the uplink path of the compensator. In this respect, the setting of the amplification in the uplink path can take place in dependence on data obtained from the cellular radio end device with respect to a transmission signal level measured by the cellular radio end device at a primary antenna connection. The amplification preferably only takes place in this respect in the uplink path of the first signal path while no amplification of the uplink signal takes place in the second signal path.

The data received from the cellular radio end device can in this respect be obtained in the form of analog and/or digital data, preferably in the form of digital data over a digital communication channel. The communication interface is preferably a data interface.

Provision can furthermore in particular be made in accordance with the invention that a plurality of different processes are provided for setting the amplification in the compensator, with the compensating selecting at least one process with reference to operating conditions. The processes available for selection implemented in the compensator can in this respect be the above-shown variants.

The selection in this respect preferably takes place in the compensator with reference to the cellular radio end device type and/or with reference to a check whether data can be received by the cellular radio end device or not.

In addition to the compensator in accordance with the invention, the present invention furthermore comprises a system for a wireless coupling of a cellular radio end device to an external antenna structure having a compensator in accordance with the invention in accordance with the first and/or second aspects of the present invention, as has been shown in more detail above, and having a coupling structure for a wireless coupling to an antenna structure of a cellular radio end device. In this respect, the first signal path of the compensator is connected and/or connectable to at least one first connection of the coupling structure.

The system in accordance with the invention can in this respect in particular serve for connecting the cellular radio end device to an external vehicle antenna structure.

The coupling structure preferably has at least two connections, with the compensator in accordance with the invention preferably being connected to the at least two connections of the coupling structure.

The most varied embodiments are possible with the coupling structure in accordance with the invention having at least two connections. It can in this respect in particular be a contiguous coupling structure that, however, has to spatially separate connections. The introduction or decoupling of the signals at different positions of the coupling structure can in this respect already provide considerably different coupling qualities in the coupling to the antenna structure of the cellular radio end device. In other possible embodiments, the coupling structure in contrast has separate and/or spatially separated coupling elements that each have at least one connection. The coupling structure in this respect preferably enables a coupling to a plurality of different antennas of a cellular radio end device and in particular of a cellular phone.

In a possible embodiment of the system in accordance with the invention, said system furthermore comprises a connection unit that connects the first signal path of the compensator to one of the at least two connections of the coupling structure in dependence on the coupling quality. In this respect, the connection unit can in particular connect the connection of the coupling structure having the better coupling quality to the first signal path of the compensator. If more than two connections are provided, the connection having the best coupling quality is preferably connected to the first signal path. Provision can in particular be made in this respect that the respective connection of the coupling structure having the better coupling quality with regard to the uplink signals of the cellular radio end device is connected to the first signal path of the compensator. A compensator in accordance with the invention is hereby ideally supported in which, in accordance with a preferred embodiment, an amplification of the uplink signals only takes place in the first signal path.

In a possible embodiment, the connection unit can evaluate the coupling quality between the antenna structure of the cellular radio end device and the at least two connections of the coupling structure during the normal communication operation of the cellular radio end device and/or continuously and/or simultaneously for both connections and/or for the transmission operation of the cellular radio end device. It can hereby in particular be ensured that it is always that connection having the currently best coupling quality that is connected to the first signal path.

If the compensator has two signal paths, the connection unit preferably connects at least two connections of the coupling structure to the first and second signal paths of the compensator. In this respect, the at least two connections of the coupling structure are preferably connected to the first and second signal paths of the compensator separately from one another.

The connection unit can in particular connect the first signal path and the second signal path of the compensator to a respective connection of the coupling structure, and in particular to a respective connection of the coupling structure separately from one another. The MIMO functionality in accordance with the invention is hereby supported.

In this respect, the connection to the first signal path can preferably take place as described above with reference to the coupling quality, with the connection having the best coupling quality preferably being connected to the first signal path. The second signal path can be connected to a connection of the coupling structure having the second-best coupling quality or to a connection that satisfies a MIMO criterion, and in particular provides the best MIMO functionality, with respect to the connection of the coupling structure that was connected to the first signal path. For from a technical viewpoint, the connection having the second-best coupling quality does not have to deliver the best performance for an MIMO operation. A predefined association of the connection of the coupling structure to the second signal path in dependence on the connection having the best coupling quality that is connected to the first signal path is therefore conceivable. This could e.g. always be the connection having the greatest spatial distance (with respect to the respective associated coupling region) from the connection having the best coupling quality. This fixed association could be implemented in the form of logic circuits or of a look-up table.

The coupling structure can in this respect be arranged in the region of a support and/or of a mount for the cellular radio end device. The cellular radio end device can in this respect in particular at least be placed in any desired position within a support and/or mount region. A transmission and/or reception unit and/or an antenna for a wireless communication interface to the cellular radio end device is preferably provided in this respect in the region of the support and/or of the mount.

The compensator is preferably connected via a signal line to the transmission and/or reception unit and/or to the antenna to provide a communication channel with the cellular radio end device. In this respect, a wireless communication interface can in particular be utilized that is anyway provided in the region of the mount and/or of the support. In this respect, in particular the signal line for connection to a connection of the coupling structure can be co-used as the signal line for connecting the compensator to the transmission and/or reception unit and/or to the antenna for the wireless communication interface, for example via a frequency separation of the corresponding signals. A separate signal line can, however, also optionally be made use of here.

The present invention will now be described in more detail with reference to an embodiment and to drawings.

DETAILED DESCRIPTION

Figure 1:
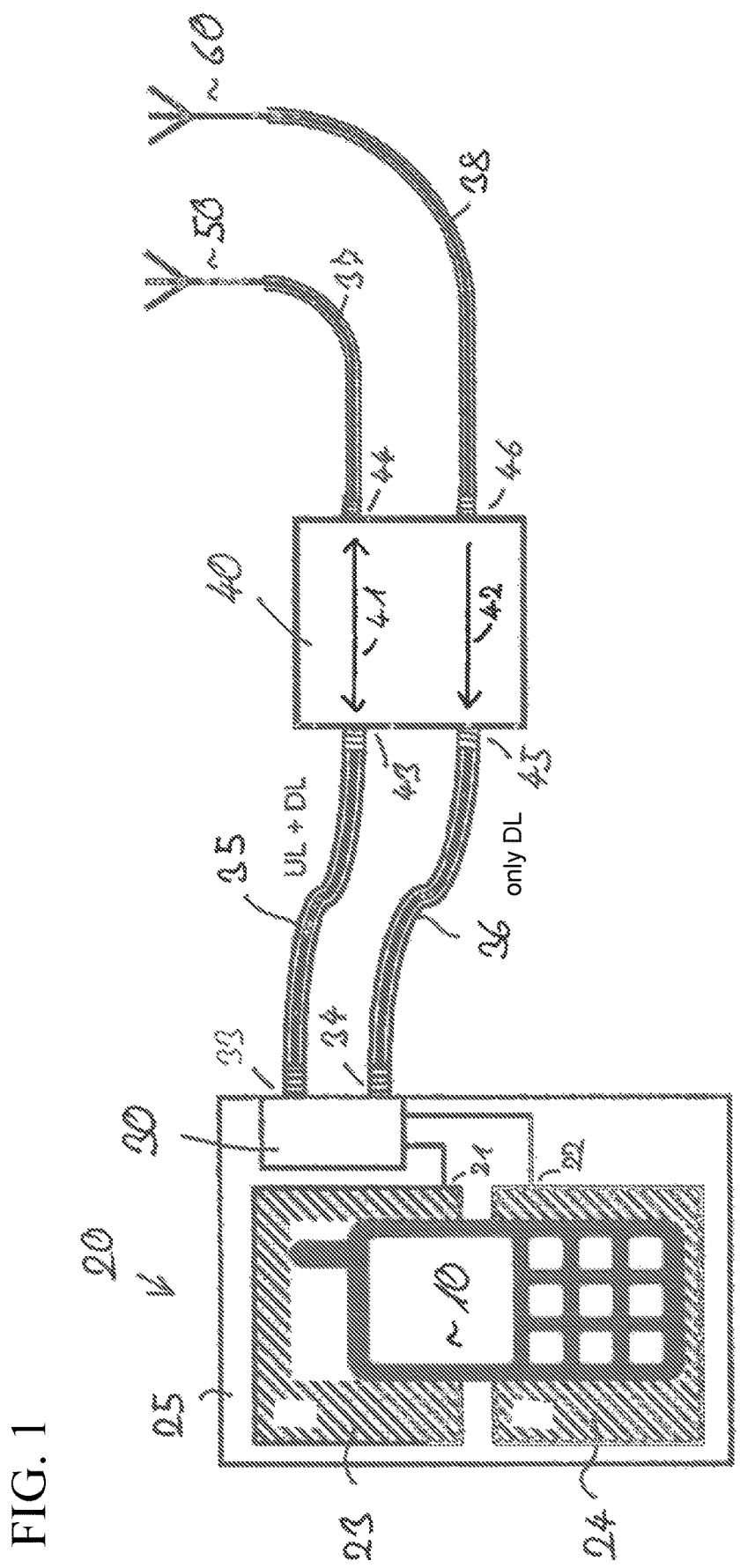
FIG. 1 shows an embodiment of a system in accordance with the invention with an embodiment of a compensator in accordance with the invention in accordance with the first aspect of the present invention in a schematic diagram.

An embodiment of a system in accordance with the invention having a coupling structure 20 and a connection unit 30, and an embodiment of a compensator 40 in accordance with the invention are shown in FIG. 1. The system in accordance with the invention in this respect serves the coupling of a cellular radio end device 10, a cellular phone in the embodiment, to a first external antenna 50 and to a second external antenna 60 of an external antenna system. The first external antenna 50 can in this respect be a primary external antenna and the second external antenna can be secondary external antenna.

The first and second external antennas can in this respect in particular be a first and a second external vehicle antenna of an external vehicle antenna structure. The first and second external antennas can in this respect be part of a vehicle roof antenna structure, for example. The external antenna structure can, however, also be a distributed structure so that, for example, the one external antenna is designed as a roof antenna and the other is arranged in the region of an outside mirror.

The coupling structure 20 serves the wireless coupling to an antenna structure of the cellular radio end device 10 and hereby enables the transmission of cellular radio RF frequency signals between the cellular radio end device 10 and the first external antenna 50 and the second external antenna 60. The coupling structure has at least two connections 21 and 22 for this purpose. In the embodiment, the coupling structure 20 in this respect has two coupling elements 23 and 24 that are arranged in the region of the mount and/or of the support 25 and that are contacted via a respective connection 21 and 22 respectively. Alternatively, however, the coupling structure can also have a spatially contiguous coupling element that is contacted via the connections 21 and 22 at two different, spatially spaced apart points.

The coupling structure 20 is in this respect typically arranged in the region of a mount and/or of a support 25 for the cellular radio end device 10, with the mount and/or the support 25 typically being arranged in the region of the vehicle interior, for example in the region of a middle console. The cellular radio end device can in this respect preferably be placed in the region of the mount and/or support in any desired position.

The compensator 40 in accordance with the invention has a first signal path 41 for connection to the first external antenna 50 and a second separate signal path 42 for connection to the second external antenna 60. The first signal path 41 in this respect has a connection 44 for connection to the first external antenna 50, with the connection taking place over a signal line 37. The second signal path has a connection 46 for connection to the second external antenna 60, with the connection taking place over the signal line 38. The signal lines 37 and 38 can in this respect be coaxial lines; the connections 44 and 46 can be coaxial connection elements, in particular coaxial sockets and/or coaxial plugs.

The compensator 40 in accordance with the invention furthermore has two connections 43 and 45 for connection to the coupling structure 20. The at least two connections 21 and 22 of the coupling structure 20 are in this respect connected via a connection unit 30 to the two connections 43 and 45 of the first and second signal paths respectively of the compensator 40 in accordance with the invention.

The connection 43 of the compensator is in this respect associated with the first signal path 41; the connection 45 is associated with the second signal path 42. The connection between the coupling structure 20 or the connection unit 30 and the compensator 40 in accordance with the invention in this respect again takes place in the embodiment over signal lines 35 and 36 that are connected to the connections 43 and 45 of the compensator. The signal lines 35 and 36 can also be coaxial lines here and the connections 43 and 45 can be coaxial connection elements, in particular coaxial sockets and/or plugs. In the embodiment, the connection unit 30 is in this respect integrated into the coupling structure 20 and has connections 33 and 34 that are connected over the connection lines 35 and 36 to the connections 43 and 45 of the compensator 40.

The connection unit 30 is configured in the embodiment such that it determines the coupling quality of the connections 21 and 22 of the coupling structure 20 to the antenna structure of the cellular radio end device 10 and makes the connection between the first and second connections of the coupling structure and the two connections 43 and 45 of the compensator 40 with reference to this coupling quality.

In a possible embodiment of the present invention, the connection unit can determine the coupling quality during the ongoing cellular radio operation of the cellular radio end device. The determination of the coupling quality in this respect preferably takes place continuously and/or simultaneously for the two connections 21 and 22. It is hereby ensured that an ideal coupling to the cellular radio end device takes place for the respective utilized cellular radio frequency band and/or the respective utilized cellular radio operating mode and additionally places it in substantially any desired position and can also be displaced during operation and a good coupling is nevertheless ensured.

The evaluation of the coupling quality by the connection unit 30 preferably takes place with respect to the uplink signal of the cellular radio end device, i.e. using the transmission signal of the cellular radio end device. In this respect, the respective connection of the coupling structure having the best coupling quality with regard to the uplink signal is connected to the first signal path 41 of the compensator. Since only two connections of the coupling structure are available in the embodiment, the respective other connection is connected to the second signal path 42.

If the coupling structure has more than two connections, the selection of the connection that is connected to the second signal path can take place with reference to the coupling quality and/or using an MIMO criterion in dependence on the connection connected to the first signal path 41, in particular to provide a MIMO functionality that is as good as possible.

With currently customary cellular radio standards and in particular with LTE, a MIMO functionality has to date only been provided for cellular radio end devices in the down link, i.e. reception of cellular radio signals via a primary antenna and via a secondary antenna of the cellular radio end device. The uplink, i.e. the transmission of cellular radio signals, only takes place, in contrast, via the primary antenna. It is ensured in this respect by the connection unit 30 that the uplink signals transmitted by the primary antenna are transmitted over the first signal path 41 to the first external antenna, with the amplifier provided in the first signal path compensating the coupling losses on the coupling of the cellular radio end device and/or compensating line losses. The first signal path 41 furthermore provides an amplification of the downlink signals. The second signal path 42 of the compensator, in contrast, does not provide any amplification of uplink signals, but supports the MIMO functionality in the downlink in that it amplifies the downlink signals.

As already indicated in FIG. 1, the first signal path 41 of the compensator in accordance with the invention thus has a different configuration of the signal processing than the second signal path 42. Provision is in particular made in this respect that the first signal path 41 carries out an amplification of both uplink signals and downlink signals. The second signal path 42, in contrast, only carries out an amplification of downlink signals. The compensator in accordance with the invention in this preferred embodiment can hereby be configured substantially more simply than if both signal paths had to provide the same functionality. The MIMO functionality in the downlink is nevertheless fully supported.

The compensator in accordance with the invention having two separate signal paths 41 and 42 for connection to a first and a second external antenna can, however, not only be used in the embodiment of a system in accordance with the invention shown in FIG. 1. A compensator in accordance with the invention could rather also be used when the connection unit 30 is dispensed with and the two connections 43 and 45 of the compensator 40 were fixedly connected to two connections 21 and 22 of a coupling structure and/or if the connection unit 30 were differently configured.

The compensator in accordance with the invention is used in such an arrangement in which it is connected to a coupling structure for a wireless connection to a cellular radio end device, in particular for compensating the coupling losses on the coupling of the antenna structure of the cellular radio end device to the coupling structure, and for compensating line losses.

The compensator in accordance with the invention can, however also be used in different applications, for example on the connection of a cellular radio end device installed in a stationary manner in a motor vehicle to the external antenna structure of the motor vehicle. The compensator can in this respect in particular serve the compensation of line losses on the connection of a head unit of a motor vehicle to the external vehicle antenna structure. The head unit can in this respect in particular provide a data link for the vehicle over a cellular radio network. In this application, the compensator is preferably connected at its two signal paths via signal lines to a primary and a secondary antenna output of the cellular radio end device.

Figure 2:
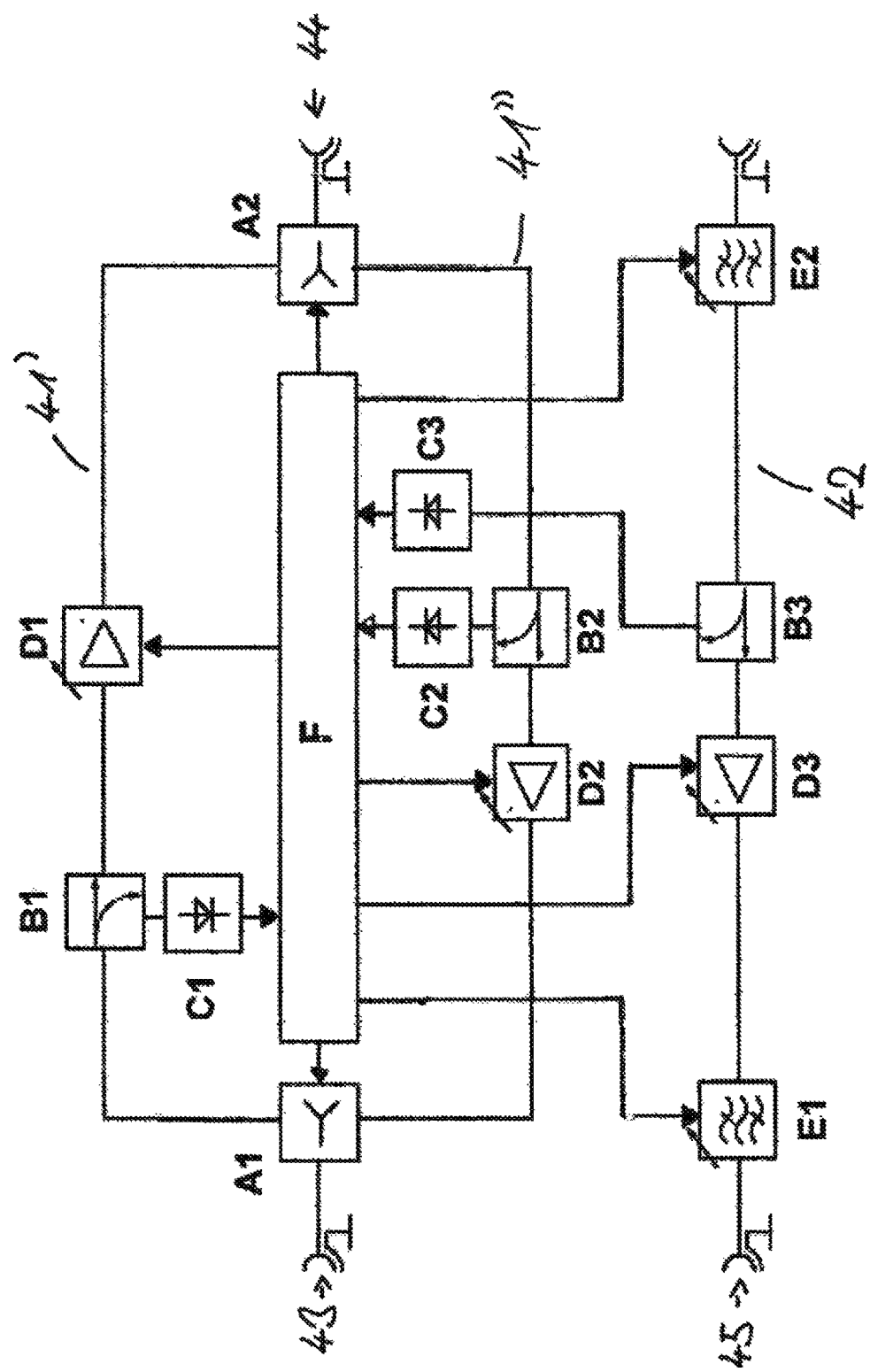
FIG. 2 shows a block diagram of the setup of an embodiment of a compensator in accordance with the first aspect of the present invention.

A principle, simplified block diagram of an embodiment of a compensator in accordance with the invention in accordance with the first aspect, i.e. having two separate signal paths 41 and 42, is shown in FIG. 2. In this respect, the first signal path 41 that connects the connection 43 to the connection 44 and that is built up of two part signal paths 41' and 41" is shown at the top in the block diagram. The second signal path 42 that connects the connection 45 to the connection 46 and that is built up from a simple signal path is shown at the bottom.

The first signal path 41 has arrangements A1 and A2 respectively at both sides at the input for a signal separation of the uplink signal and of the downlink signal. The first signal path is thus divided via the two arrangements for a signal separation into a first part signal path 41' for the uplink signals and a second part signal path 41" for the downlink signals. The separation of the signals takes place by frequency (e.g. UMTS, LTE, FDD) or time (LTE TDD) depending on the active cellular radio method.

Respective arrangements for signal decoupling (B1 in the uplink signal path 41' and B2 in the downlink signal path 41") are provided along the two part signal paths 41' and 41" and decouple a part signal from the respective signal path and from a power measurement C1 and C2 respectively.

The second signal path 42 in this respect has a similar setup to the downlink signal path 41' of the first signal path. Instead of the arrangements for signal separation, only adjustable filter structures E1 and E2 that carry out a selection of the frequency band are provided at the input and at the output. A signal separations by time is in contrast not necessary since no separation into part signal paths takes place for the uplink signal and the downlink signal.

In the second signal path 42, an arrangement for signal decoupling B3 can optionally likewise be provided that supplies a part signal to a power measurement C3. The reception power (RSSI inter alia) can hereby optionally be carried out in the active frequency band.

Respective settable amplifier circuits D1 and D2 are provided in the first two part signal paths 41' and 41"; one settable amplifier circuit D3 is provided in the second signal path 42. The amplifier circuit D1 in the uplink part signal path 41 of the first signal path is a power amplifier; the amplifier circuits D2 and D3 in the respective downlink signal paths are low noise amplifiers (LNAs).

The analysis of the signals and the control of the individual components in the first and second signal paths takes place by the control F in this process. The latter has the following functionalities, for example:

The control F detects the respective active cellular radio operating mode and in particular the respective active cellular radio communication process (for example, GSM/UMTS/LTE) and the respective active cellular radio frequency band using the uplink signal decoupled from the uplink part signal path 41' of the first signal path 41. The decoupling and the power measurement in this respect take place via the components B1 and C1.

The control F controls both the arrangement for signal separation A1 and A2 and the settable filter structures E1 and E2 using the active cellular radio communication process and/or the active cellular radio frequency band. Provision can furthermore be made that the control F switches off the second signal path 42 if the just active cellular radio communication process does not support MIMO, i.e. if the cellular radio operation currently takes place via GSM, for example. Interference at the cellular radio end device is hereby avoided.

A power assessment of at least the uplink signal further takes place via the control F in the uplink part signal path 41' of the first signal path and preferably also in the two downlink signal paths 41" and 42. The control furthermore carries out an adaptation of the amplification in the uplink direction and in the downlink direction. The amplifiers D1, D2 and D3 are in particular controlled via the control F.

In this respect, different processes for the amplification determination and for the adaption are conceivable that are automatically carried out by the control F. The following two processes are inter alia conceivable as possible processes for amplification adaptation in the embodiment shown in FIG. 2:

1. The coupling damping can be estimated by a comparison of the signal level of the uplink signal with an expected transmission signal level of the cellular radio end device and can be compensated by a corresponding setting of the amplification at least in the uplink. The amplification in the two downlink paths can furthermore take place in dependence on the amplification in the uplink path and in particular using the same or similar values as in the uplink path, while observing normative defaults. The amplification in the uplink part path 41 can in this respect in particular be set identically with the amplification in the downlink part path 41" of the first signal path and/or with the amplification in the second signal path 42.

2. The amplifications in the two downlink paths can be set based on the measured values of the reception powers (via B2/C2 and B3/C3) by the external antennas 50 and 60 while observing normative defaults. In this respect, the measured levels of the downlink signals can in particular be compared with desired levels and the amplifications can be controlled accordingly. Optionally, alternatively to this, the amplifications can also only be set in the two downlink paths via the power measurement in the downlink path 41" of the first signal path. The setting of the amplification in the uplink can take place as in possibility 1.

3. A combination of the processes under 1. and 2. can furthermore take place in that a determination of the coupling damping takes place via a comparison of the signal level in the uplink with an expected signal level, with the amplification in the uplink path being set directly for compensating the coupling damping and the level of the reception signals additionally being measured for the amplification in the two downlink paths for the amplification and entering into the adaptation of the amplification together with the coupling damping. Not only the coupling damping can in particular thus be compensated, but possibly also weak reception conditions.

It is furthermore conceivable to carry out the adaptation of the amplifications using additional data that are provided by the cellular radio end device. For this purpose, the compensator preferably has, as still shown in more detail in the following, a communication interface for establishing a communication channel with the cellular radio end device. In particular the following processes can be provided in this respect as further processes for adapting the amplification:

4. The amplifications in the downlink can take place based on the respective values of the reception power measured in the compensator (via B2/C2 and B3/C3) and on additional information of the cellular radio end device with respect to the reception levels measured by the cellular radio end device. The cellular radio end device can in this respect in particular measure the reception level for a first and a second antenna, in particular for a primary antenna and a secondary antenna, with these data being read by the compensator and being used for adapting the respective amplification in the two downlink paths. The amplification in the uplink can in contrast take place as described above under option 1.

5. The adaptation of the amplification both in the uplink and the amplifications in the two downlink paths can take place based on the powers measured in the compensator (via B1/C1, B2/C2, and B3/C3) and on additional information on the part of the cellular radio end device on the transmission level or the measured reception level.

Provision can be made in this respect that the compensator supports a plurality and/or all of the above-presented processes and selects the respective process used flexibly in dependence on the cellular radio end device type and/or in dependence on a check whether additional information can be provided by the cellular radio end device. In this respect, processes 4. or 5. are in particular preferably used when information can be provided by the cellular radio end device, while processes 1. to 3. are preferably used when no information can be provided. The compensator in this respect preferably supports at least one of the processes under 1. to 3. and at least one of the processes under 4. and 5.

As already mentioned above, the carrying out of processes 4. and 5. in this respect requires a communication channel between the compensator and the cellular radio end device.

Figure 3:
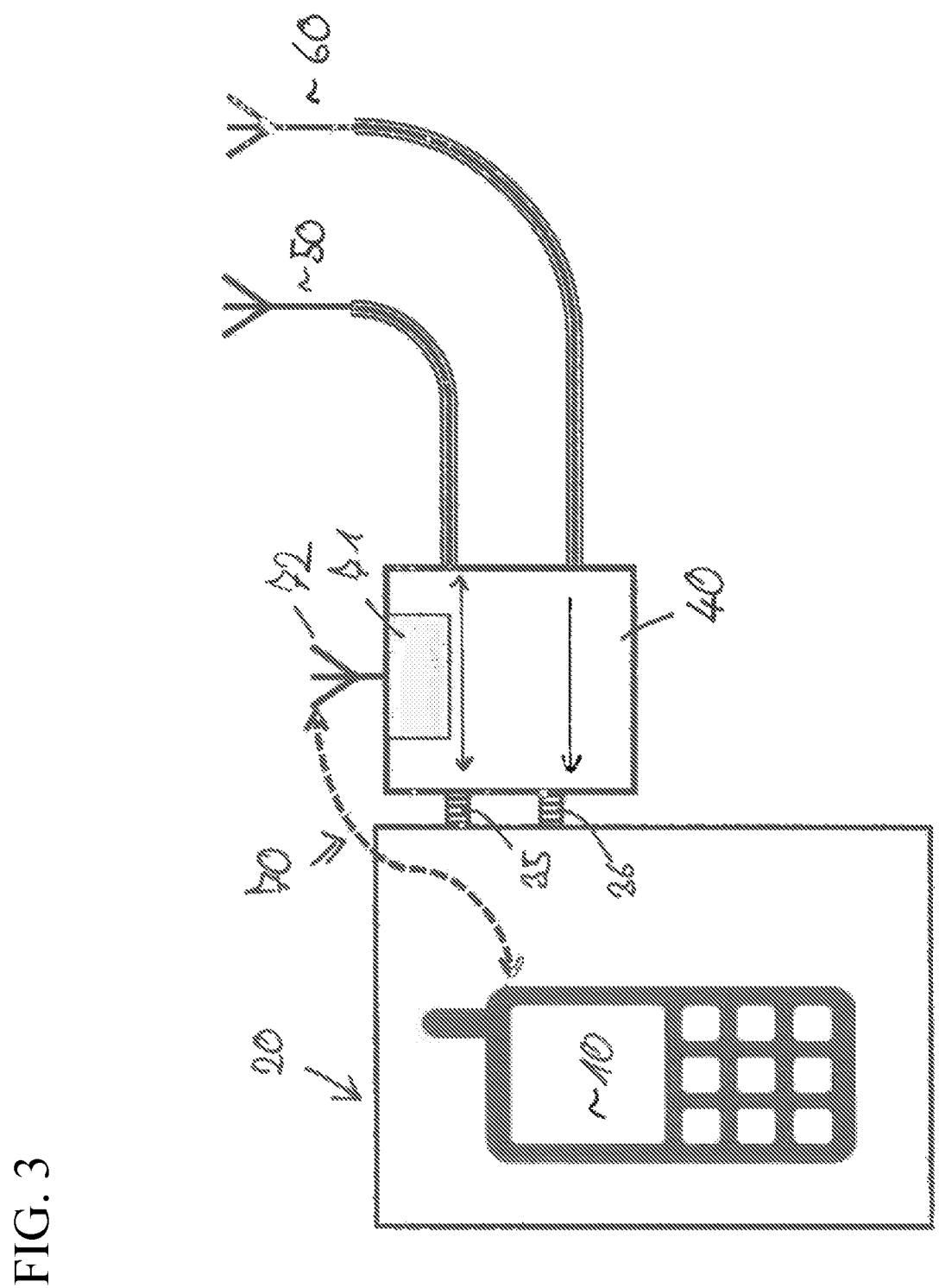
FIG. 3 shows an embodiment of a system and of a compensator in accordance with the first and second aspects of the present invention in a schematic diagram.

An embodiment of a system in accordance with the invention and of a compensator in accordance with the invention in accordance with the second aspect of the invention is now shown in FIG. 3, with the compensator having a communication interface 71 for providing a communication channel 70 with a cellular radio end device 10.

The communication interface of the compensator 40 in accordance with the second aspect of the present invention is in this respect preferably a data interface for communication with the cellular radio end device 10. The data received from the cellular radio end device 10 can in this respect be used for optimizing the system performance of the compensator by utilizing additional information provided by the cellular radio end device and/or for reducing the complexity in the setup of the compensator. In this respect, information on one or more of the following values can in particular be accessed by the cellular end device or can be provided to the compensator: reception level, transmission level, active cellular radio operating mode and/or active cellular radio frequency band.

If data on the reception level and/or transmission level are transmitted to the compensator, they can be used for setting the amplification in the compensator. This preferably takes place as has already been shown above.

If data on the active cellular radio operating mode and/or on the active cellular radio frequency band are also transmitted to the compensator, the control of the separation arrangements for signal separation (for example in the first signal path) and/or the control of settable filter structures for selecting the respective active frequency band can take place using these data and/or a check of the current cellular radio operating mode and/or of the current cellular radio frequency band determined by the control F using the analysis of the signal within the compensator can take place.

The most varied protocols and standards are conceivable for the data transfer between the compensator and the cellular radio end device. In this respect, the communication channel can be a wired or a wireless communication channel depending on the purpose of use.

If the compensator is used for compensating line losses on the connection of a cellular radio end device fixedly installed in the motor vehicle, in particular a head unit, the communication channel between the cellular radio end device and the compensator can take place in a wired manner. In this respect, the communication can in particular take place over one of the signal lines that is used for transmitting the RF cellular radio signals. The communication can in this respect be separated from the RF cellular radio signals by utilizing a different frequency range.

If, in contrast, the compensator is located at a coupling structure for compensating the coupling losses in the wireless connection of a cellular radio end device, the communication channel is preferably likewise wireless. For example, communication can preferably take place via wireless LAN, Bluetooth or near field communication (NFC). In this respect, the most varied standards and/or processes for communication with the cellular radio end device are conceivable, in particular with regard to the manner how corresponding data are read from the cellular radio end device and which instruction set is used for this purpose.

In the embodiment provided in FIG. 3, the compensator 40 communicates wirelessly directly with the cellular radio end device 10. For this purpose, the communication interface 71 of the compensator 40 has an antenna 72 via which the wireless communication channel 70 is directly established with the cellular radio end device. Such a design can in particular be used when the coupling structure 20 and the compensator 40 are arranged at a small spatial distance. In FIG. 3, the connections of the coupling structure 20 are in this respect coupled to the connections of the compensator 40 directly or by a short intermediate piece 35 and 36. It would equally be conceivable to integrate the compensator in the coupling structure 20.

Figure 4:
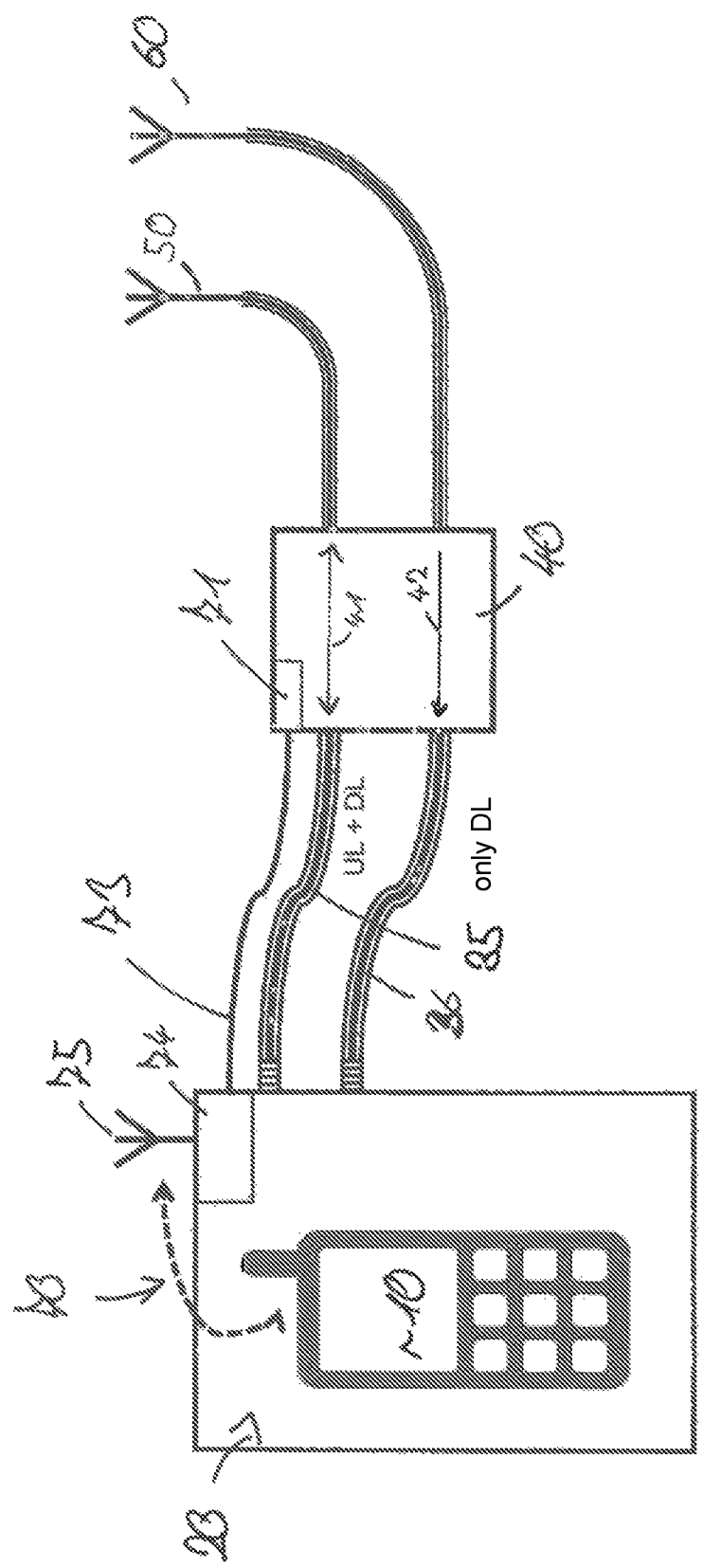
FIG. 4 shows a further embodiment of a system in accordance with the invention of a compensator in accordance with the invention in accordance with the first and second aspects of the present invention in a schematic diagram.

Provision is made in the embodiment provided in FIG. 4, in contrast, that the wireless communication to the cellular radio end device 10 takes place by an additional apparatus 74 that is arranged in direct spatial proximity to the coupling structure 20 and preferably in the same housing as the coupling structure 20. In modern cellular radio terminals in the vehicle, so-called "cradles", in this respect, in addition to the coupling structure for a pure cellular radio coupling, additional functionalities such as wireless power charging and near field communication (NFC) can be integrated. In accordance with the invention, the NFC functionality can in this respect be co-used for the wireless data exchange with the cellular radio end device.

In this case, the coupling structure 20 and thus the mount and/or support for the cellular radio end device can also be arranged spatially separate from the compensator 40. In this respect, the communication between the arrangement 74 that provides wireless communication to the cellular radio end device and the interface 71 of the compensator 40 is wired.

In the embodiment shown in FIG. 4, a separate connection line 73 is provided for this purpose. Alternatively, however, one of the coaxial cables 35 or 36 via which the RF cellular radio signals are exchanged between the compensator and the coupling structure could also be used for the data transmission and for setting up the communication between the interface 71 and the arrangement 74. In this respect, a frequency-wise separation with respect to the RF cellular radio signals can in particular be carried out.

The arrangement 74 that is arranged in the region of the coupling structure 20 can in this respect in particular be a transmission/reception unit having an antenna 75 that establishes the wireless communication channel 70 to the cellular radio end device 10. As already presented in more detail above, wireless LAN, Bluetooth or near field communication (NFC) can in this respect be used for the wireless communication. In this respect, the arrangement 74 can optionally also be co-used by other components in the vehicle.

Figure 5:
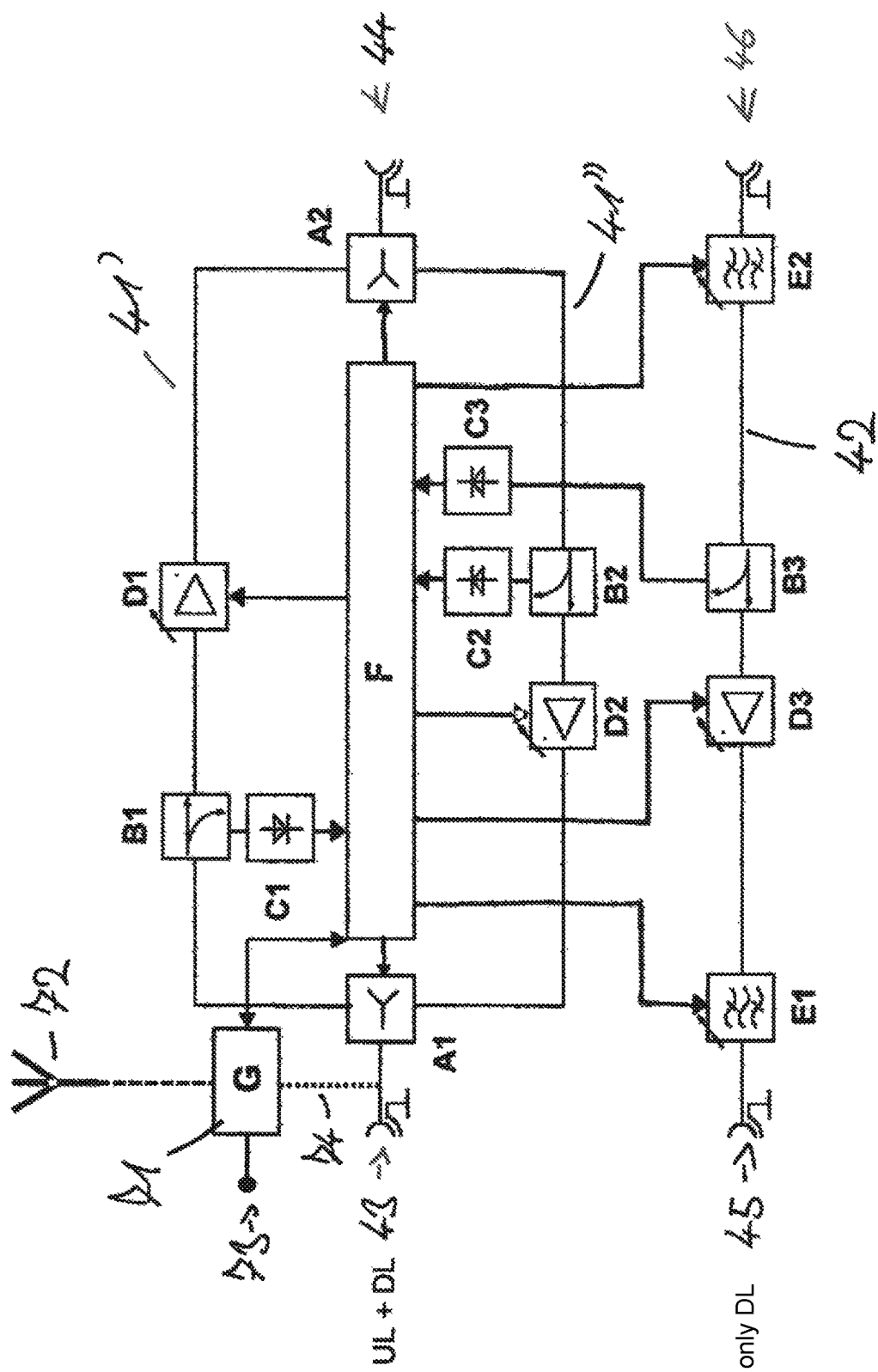
FIG. 5 shows a block diagram of the setup of a compensator in accordance with the first and second aspects of the present invention.

A block diagram of a compensator 40 configured accordingly for the provision of a communication channel is now shown in FIG. 5. In this respect, it was only a supplement to the block diagram in FIG. 2 so that reference is made to the above representation with respect to the components already included in FIG. 2.

In addition, the compensator 40 here has a data interface 71 that enables a bidirectional communication between the control F of the compensator and the cellular radio end device. The data interface 71 in this respect in particular enables the accessing of information from the cellular radio end device, in particular information on the reception level, on the transmission level, on the active cellular radio operating mode, and on the active cellular radio frequency band.

In FIG. 5 in this respect, all three of the alternatives for providing the communication channel described above are shown. In a first variant, the wireless communication can take place directly between the compensator and the cellular radio end device, for which purpose the compensator is equipped with an antenna 72 that is controlled by the data interface 71. In a second variant, in contrast, either the antenna or a transmission/reception unit having an antenna can be arranged separately from the compensator and can communicate in a wired manner with the data interface 71 of the compensator. For this purpose, either a separate signal line 73 can be connected to the data interface 71 or the wired communication takes place via the connection 43 or 45 that is used for the cellular radio RF signals. A connection 74 between the data interface 71 and the connection 43 is shown for this purpose in FIG. 5.

The use of a data interface in accordance with the invention and of a communication in accordance with the invention between the control F of the compensator and the cellular radio end device can in this respect also be used when the compensator only has one signal path and thus only permits the connection to a single external antenna.

In this case, the second signal path 42 having the components arranged along this signal path would simply be dispensed with in the block diagram shown in FIG. 5. The first signal path could in contrast work in the same manner as was shown in more detail above with regard to the embodiment having two signal paths.

In this case, the information received from the cellular radio end device 10 can in particular be used for adapting the amplification in the uplink or in the downlink of the first signal path as was shown in more detail above for the first signal path of the first embodiment. In this respect, an adaptation of the amplification in the downlink can in particular take place based on the values of the reception power measured in the compensator and on additional information on the side of the cellular radio end device on the reception level measured by the cellular radio end device and/or an adaptation of the amplification in the uplink can take place based on the measured power in the compensator in the uplink and on additional information on the side of the cellular radio end device on the transmission level. The information provided by the cellular radio end device can in this respect in particular relate to the signal level of the primary antenna of the cellular radio end device.

The second aspect of the present invention is, however, preferably used in combination with the first aspect, i.e. in a compensator having a first and a second signal path.

The present invention is in this respect not limited to only one signal path or to only two separate signal paths in both the first aspect and in the second aspect. It is rather likewise conceivable to use more than two parallel signal paths to improve the MIMO functionality even more.

The first aspect of the present invention in this respect expands the damping compensation provided by the compensator by a MIMO functionality, in particular in the downlink direction. An improved system performance and/or reliability hereby results.

In this respect, a smaller circuit effort results due to the preferred embodiment since the damping compensation in the uplink direction always only takes place in a fixed signal path. A corresponding connection unit is advantageously used for this purpose for connection to the coupling structure.

The use of a data interface in accordance with the second aspect enables an optimization of the system performance by additional information on the side of the cellular radio end device and is preferably used in combination with the first aspect.

The invention claimed is:

1. A compensator for compensation of line losses and/or coupling losses in a connection of a cellular radio end device to an external antenna structure, wherein the compensator has a first signal path for connecting the cellular radio end device to a first external antenna of the external antenna structure,
wherein the compensator has a second signal path for connecting the cellular radio end device to a second external antenna of the external antenna structure, the compensator having two connections for connection to a coupling structure for coupling to the cellular radio end device and having two connections for connection to the first and second external antennas, wherein the two signal paths each connect one of the connections for connection to the coupling structure and one of the connections for connection to an external antenna.

2. The compensator in accordance with claim 1, wherein the two signal paths have different designs; wherein a control that carries out setting of an amplification for the two signal paths is configured differently in the two signal paths; and/or wherein the amplification takes place both in an uplink and in a downlink in the first signal path, while the amplification only takes place in a downlink or only in an uplink in the second signal path.

3. The compensator in accordance with claim 1, wherein a signal processing takes place in one of the two signal paths in dependence on the signal processing in the other signal path and/or in dependence on measurement values determined in the other signal path, with the signal processing in the second signal path taking place in dependence on the signal processing in the first signal path and/or in dependence on measurement values determined in the first signal path; and/or wherein a frequency selection and/or a magnitude of an amplification in one of the two signal paths is set in dependence on a frequency selection and/or on a magnitude of an amplification in the other signal path.

4. The compensator in accordance with claim 1, wherein the signal processing takes place using an evaluation of uplink signals in at least one of the signal paths, with a currently used cellular radio operating mode and/or a currently used cellular radio frequency being determined with reference to the uplink signals and being used for controlling the signal processing and/or for frequency selection and/or signal separation; and/or wherein the frequency selection in the second signal path is set in dependence on a currently used cellular radio operating mode determined in the first signal path and/or on a currently used cellular radio frequency band determined in the first signal path; and/or wherein an amplification is set in the second signal path in dependence on the currently used cellular radio operating mode, with the second signal path being switched on or off in dependence on the currently used cellular radio operating mode.

5. The compensator in accordance with claim 1, wherein the compensator has a communication interface via which a communication channel is established with the cellular radio end device.

6. The compensator in accordance with claim 5, wherein signal processing in the first signal path is set in dependence on data that the compensator receives from the cellular radio end device via the communication channel.

7. The compensator in accordance with claim 5, wherein the communication channel is a wireless communication channel; and/or wherein the compensator is connected via a signal line to a transmission and/or reception unit and/or an antenna for a wireless communication channel; and/or wherein a connection of the compensator for coupling the first signal path of the compensator to the cellular radio end device is also used for communication with the transmission and/or reception unit and/or antenna.

8. The compensator in accordance with claim 6, wherein the compensator has a second signal path for connecting the cellular radio end device to a second external antenna of the external antenna structure, wherein the signal processing in the two signal paths is set in dependence on the data that the compensator receives from the cellular radio end device via the communication channel, with the setting taking place differently for the two signal paths.

9. The compensator in accordance with claim 1, having at least one separation arrangement for separating an uplink signal and a downlink signal in the first signal path, wherein no separation arrangement for separating an uplink signal and a downlink signal is provided in the second signal path; and/or having a frequency selection in the first signal path and/or in the second signal path, with the frequency selection being controlled in the second signal path in dependence on the first signal path; and/or having a measurement arrangement for measuring a signal level of the uplink signal and/or of the downlink signal in the first signal path; and/or having a measurement arrangement for measuring a signal level of the uplink signal and/or of the downlink signal; and/or having a respective at least one amplifier for the uplink signal and for the downlink signal in the first signal path; and/or having one amplifier for the downlink signal in the second signal path.

10. The compensator in accordance with claim 1, wherein the setting of the amplification in the compensator takes place in accordance with at least one of the following processes:

setting an amplification in a downlink path in dependence on the amplification and/or on measurement values with respect to a signal level of an uplink path, with the setting of the amplification in the downlink paths of the first and second signal paths taking place in dependence on the amplification and/or on measurement values with respect to the uplink path of the first signal path;

setting the amplification in the downlink path in dependence on measurement values with respect to the signal level of the downlink path, with the setting of the amplification in the downlink paths of the first and second signal paths respectively taking place separately in dependence on measurement values on the respective downlink path;

setting the amplification in the downlink path in dependence on measurement values with respect to the downlink path and with respect to an uplink path, with coupling damping being determined by comparison of the signal level of the uplink signal with a predefined value and being used together with the signal level of the downlink signal for setting the amplification;

setting the amplification in the downlink path in dependence on data received from the cellular radio end device on a reception level measured by the cellular radio end device and furthermore in dependence on the signal level in the downlink path of the compensator; and setting an amplification in an uplink path in dependence on data received from the cellular radio end device on a transmission power output by the cellular radio end device and on measurement values with respect to the signal level of the uplink path, with the amplification only taking place in the uplink path of the first signal path; and/or setting the amplification in the uplink path in dependence on data received from the cellular radio end device on a transmission signal level at a primary antenna connection measured by the cellular radio end device.

11. The compensator in accordance with claim 1, wherein a plurality of different processes are provided for setting the amplification in the compensator; wherein the compensator selects at least one process with reference to operating conditions, with the selection taking place with reference to a cellular radio end device type and/or to a possibility of receiving data from the cellular radio end device; and wherein the setting of an amplification in downlink paths of the first and second signal paths respectively takes place separately in dependence on data on reception levels measured by the cellular radio end device for a primary and a secondary antenna connection of the cellular radio end device and on measurement values on the respective downlink path.

12. A system for wireless coupling of a cellular radio end device to an external antenna structure having a compensator comprising a first signal path for connecting the cellular radio end device to a first external antenna of the external antenna structure, wherein the compensator has a second signal path for connecting the cellular radio end device to a second external antenna of the external antenna structure, the compensator having two connections for connection to a coupling structure for coupling to the cellular radio end device and having two connections for connection to the first and second external antennas, wherein the two signal paths each connect one of the connections for connection to the coupling structure and one of the connections for connection to an external antenna; wherein the system comprises the coupling structure for the wireless coupling to the external antenna structure of the cellular radio end device, wherein the first signal path of the compensator is connected and/or connectable to at least one first connection of the coupling structure, with the coupling structure having at least two connections.

13. The system in accordance with claim 12, having a connection unit that connects the first signal path of the compensator to one of the at least two connections of the coupling structure in dependence on a coupling quality, wherein the connection unit connects the connection of the coupling structure having a better coupling quality to the first signal path of the compensator;
  wherein the connection unit evaluates the coupling quality between the external antenna structure of the cellular radio end device and the at least two connections of the coupling structure during normal communication operation of the cellular radio end device and/or continuously and/or simultaneously for both connections and/or for transmission operation of the cellular radio end device;
  and/or wherein at least two connections of the coupling structure are connected and/or connectable by the connection unit to the first signal path and to the second signal path of the compensator, with the at least two connections of the coupling structure being connected and/or connectable separately from one another via the connection unit to the first and second signal paths of the compensator, with the connection unit connecting the first signal path and the second signal path of the compensator to a respective connection of the coupling structure, and with the connection of the first signal path taking place with reference to the coupling quality and the connection of the second signal path taking place with reference to the coupling quality and/or to the connection selected for the first signal path.

14. The system in accordance with claim 12, wherein the coupling structure is arranged in a region of a support and/or of a mount for the cellular radio end device, with a transmission and/or reception unit and/or antenna for a wireless communication interface with the cellular radio end device being provided in the region of the support and/or of the mount, with the compensator being connected via a signal line to the transmission and/or reception unit and/or antenna to provide a communication channel with the cellular radio end device, with a signal line for connection to a connection of the coupling structure being used as the signal line.

15. The compensator in accordance with claim 1, wherein the two signal paths are parallel signal paths; and wherein the external antenna structure is an external vehicle antenna structure.

16. The compensator in accordance with claim 2, wherein the amplification takes place only in the downlink in the second signal path.

17. The system in accordance with claim 4, wherein the signal processing takes place using the evaluation of the uplink signals in the first signal path.

18. The compensator in accordance with claim 7, wherein the wireless communication channel is an NFC, a Bluetooth, and/or a wireless LAN.

19. The compensator in accordance with claim 9, wherein the measuring of the signal level is only of the downlink signal in the second signal path.

20. The compensator in accordance with claim 6, wherein the data are data on a currently used cellular radio operating mode and/or on a currently used cellular radio frequency band and/or on a current transmission level and/or on a current reception level of the cellular radio end device; and/or wherein a signal path separation and/or a frequency selection and/or an amplification is set in dependence on data that the compensator receives from the cellular radio end device via the communication channel.

21. The compensator in accordance with claim 1, wherein the external antenna structure is an external vehicle antenna structure.

22. The compensator in accordance with claim 5, wherein the external antenna structure is an external vehicle antenna structure.

* * * * *